Jan. 12, 1932. R. R. CUNNINGHAM 1,840,703
DENTAL ARCH TEST CARD
Filed May 16, 1929
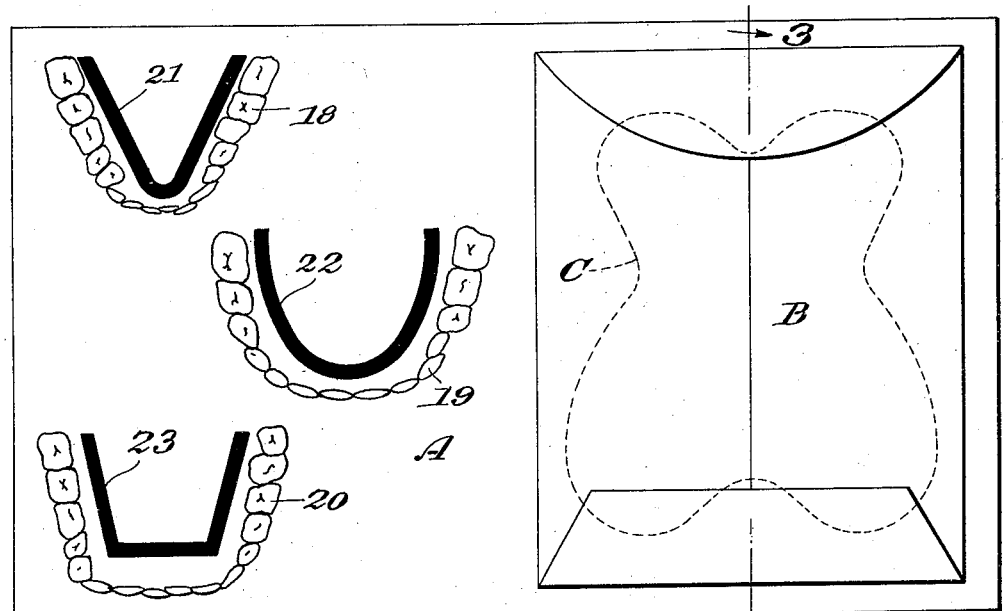
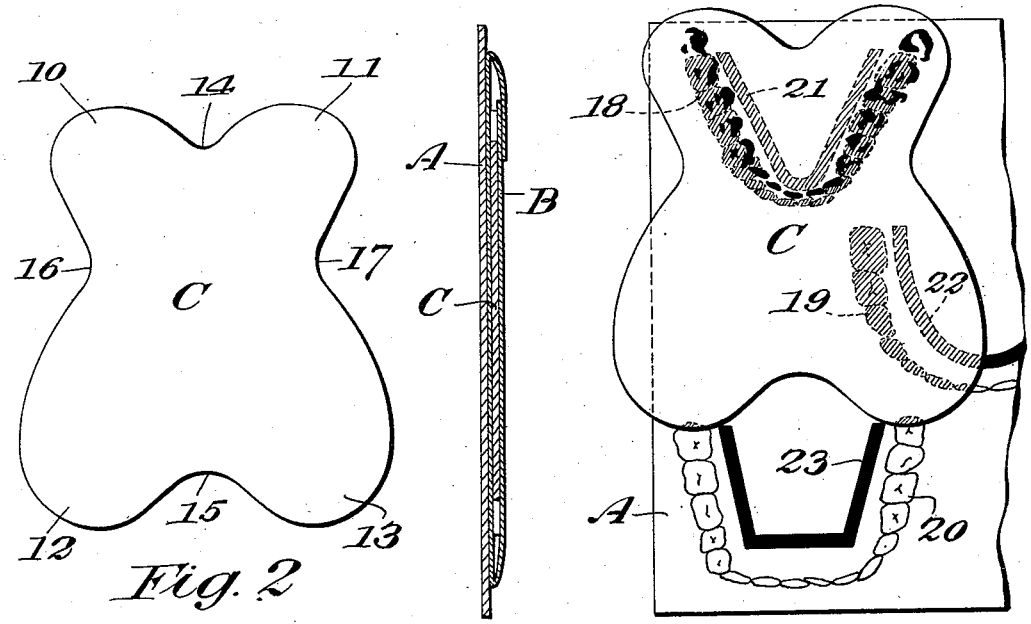

Patented Jan. 12, 1932

1,840,703

UNITED STATES PATENT OFFICE

ROY R. CUNNINGHAM, OF NEW YORK, N. Y., ASSIGNOR, BY MESNE ASSIGNMENTS, TO PRO-PHY-LAC-TIC BRUSH COMPANY, OF WILMINGTON, DELAWARE, A CORPORATION OF DELAWARE

DENTAL ARCH TEST CARD

Application filed May 16, 1929. Serial No. 363,519.

In the choice of a tooth brush and in dentistry, it is frequently necessary to determine accurately the shape of the dental arch, particularly with reference to the three or more typical shapes into which it is now recognized that human dental arches may be classified. My present invention provides a simple and convenient apparatus for doing this, which can be made for a trifling amount and which can be used by persons having no knowledge or skill of the subject. It also enables such persons to determine instantly and accurately to which of the typical dental arches the arch in question belongs. While the apparatus embodying the invention is intended for use by unskilled persons and the general public, it also enables dentists and other highly skilled persons to determine the question much more rapidly and accurately than now possible.

The invention will be more fully understood from the following description when taken in connection with the accompanying drawings and the novel features thereof will be pointed out and clearly defined in the claims at the close of this specification.

In the drawings:

Fig. 1 is a plan view of an apparatus or test card embodying my invention.

Fig. 2 is a plan view of the plaque or wafer.

Fig. 3 is a section on line 3—3, Fig. 1.

Fig. 4 is a view showing the plaque or wafer on which an impression has been taken superposed on one of the typical outlines, to show the manner in which the conventionalized outline is visible through the plaque.

Referring to the drawings, at A is shown a card which is conveniently provided with an envelope B to receive one or more plaques or wafers C. (See also Fig. 2). These plaques or wafers are made of some soft transparent or semitransparent substance capable of receiving an impression, such, for instance, as sheet wax or even waxed paper. The plaque is provided with two pairs of diverging lobes 10, 11 and 12, 13, the two lobes of each pair being separated from each other by a slight indentation, 14 and 15, respectively, and there being other slight indentations 16 and 17 between the two pairs of lobes. It will also be seen that one pair of lobes extends laterally more widely than the other. By this arrangement it is possible to make a single size of plaque which can be used to test a great variety of sizes and shapes of mouths,—in fact, I find that a single plaque of this shape can be used to test all adult dental arches and that it is not necessary to have more than one size. The plaque is flexible and therefore can be bent slightly as it is inserted in the mouth and the indentations 16 and 17, on the two side edges help to assist the insertion which can be readily done by inserting first one lobe and then the other. The side indentations assist in centering the plaque in the mouth, since they contact with the insides of the cheeks and lips at the corners of the mouth and the plaque naturally finds the correct position for the impression. The indentations 14 and 15 between the two lobes of each pair permit the lobes to be pushed well back under the wisdom teeth without touching the palate or back of the throat which might cause the subject to cough. The portion of the plaque which is not inserted between the teeth affords a gripping portion, and as pointed out, its tapered or reduced size enables it to fit the mouth at the indentations 16 and 17.

On the card A are printed the outlines 18, 19 and 20 of two or more dental arches of typical size and shape. In practice, I prefer to have three to correspond to the three main classes of dental arches as determined by competent authority from the study and classification of many thousands of all races and periods. These three types are the V-shaped arch 18, the oval arch 19, and the square arch 20. It will be understood that while these three are sufficient for ordinary conditions, I do not limit myself to this number. Adjacent and preferably inside each of the arch outlines 18, 19 and 20, I place a conventional outline which represents roughly the shape of the arch to which it pertains. These conventionalized outlines are designated 21, 22 and 23 and are printed in some dark color which contrasts strongly with the color of the transparent substance used for the plaque. Thus if the plaque is pink or red, the conventional outlines may be printed in blue. By this arrangement, the conventional outlines will stand out sharply through the plaque when one is superposed on the other for comparison.

In using my novel apparatus, the plaque C is withdrawn from the envelope B and inserted in the subject's mouth in the manner already explained. Care is taken that it is placed evenly, and is well back so that the impression of all of the teeth will fall on the plaque. The subject then bites firmly on the plaque which impresses on it a record which is usually somewhat faint—of the shape of the subject's dental arch. The plaque is then withdrawn from the mouth and placed successively on the outlines on the test card as shown in Fig. 4. The conventionalized outlines, being usually smaller than the actual impression show through the plaque and fall inside the impression on the plaque. By this means, it is possible to determine almost instantly to which conventionalized outline the impression corresponds, and therefore to which class the subject's dental arch belongs.

The process of testing a dental arch takes only a short time, and is interesting to the subject.

What I claim is:

1. A plaque or wafer for determining the shape of the dental arch which comprises a sheet of a substance capable of receiving an impression, said sheet having two pairs of lobes, one pair of said lobes being of wider spread than the other, and the pairs of lobes being separated by indentations adapted to fit the corners of the mouth.

2. A plaque or wafer for determining the shape of the dental arch which comprises a transparent sheet of a substance capable of receiving an impression, said sheet having two pairs of lobes, one pair of said lobes being of wider spread than the other, and the pairs of lobes being separated by indentations adapted to fit the corners of the mouth.

3. A plaque or wafer for determining the shape of the dental arch which comprises a sheet of a substance capable of receiving an impression, said sheet having a pair of lobes tapering from said plaque whereby to form a hand gripping portion, the tapered section of the plaque being of less spread than the lobes whereby to fit the mouth.

4. A plaque or wafer for determining the shape of the dental arch which comprises a transparent sheet of a substance capable of receiving an impression, said sheet having a pair of lobes tapering from said plaque whereby to form a hand gripping portion, the tapered section of the plaque being of less spread than the lobes whereby to fit the mouth.

In testimony whereof I affix my signature.

ROY R. CUNNINGHAM.